US009891668B2

United States Patent
Abe et al.

(10) Patent No.: US 9,891,668 B2
(45) Date of Patent: Feb. 13, 2018

(54) INFORMATION PROCESSING DEVICE

(71) Applicant: FUJITSU LIMITED, Kawasaki-shi, Kanagawa (JP)

(72) Inventors: Takashi Abe, Kawasaki (JP); Kaito Tanaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 52 days.

(21) Appl. No.: 15/223,801

(22) Filed: Jul. 29, 2016

(65) Prior Publication Data
US 2017/0053754 A1 Feb. 23, 2017

(30) Foreign Application Priority Data

Aug. 19, 2015 (JP) .................................. 2015-162186

(51) Int. Cl.
| | |
|---|---|
| *G06F 1/16* | (2006.01) |
| *G06F 3/033* | (2013.01) |
| *G06F 3/0354* | (2013.01) |
| *H01H 13/705* | (2006.01) |

(52) U.S. Cl.
CPC ............ *G06F 1/1633* (2013.01); *G06F 1/169* (2013.01); *G06F 1/1684* (2013.01); *G06F 3/033* (2013.01); *G06F 3/03547* (2013.01); *H01H 13/705* (2013.01)

(58) Field of Classification Search
CPC .... G06F 1/1633; G06F 3/03547; G06F 3/033; G06F 1/169; G06F 1/1684; H01H 13/705
USPC .................................................. 361/679.55
See application file for complete search history.

(56) References Cited

U.S. PATENT DOCUMENTS

| | | | | |
|---|---|---|---|---|
| 2013/0271302 | A1* | 10/2013 | Filson .................. | G06F 3/0219 341/33 |
| 2013/0285984 | A1* | 10/2013 | Degner ............... | G06F 3/03547 345/175 |
| 2013/0321321 | A1* | 12/2013 | Hiraoka .................. | G06F 3/016 345/173 |
| 2013/0322026 | A1* | 12/2013 | Huang ..................... | H05K 7/02 361/728 |
| 2014/0009441 | A1* | 1/2014 | Bernstein ................ | G06F 3/016 345/174 |

(Continued)

FOREIGN PATENT DOCUMENTS

JP 2013-218975 A 10/2013

*Primary Examiner* — Binh Tran
*Assistant Examiner* — Douglas Burtner
(74) *Attorney, Agent, or Firm* — Westerman, Hattori, Daniels & Adrian, LLP

(57) ABSTRACT

An electronic device includes: a case; a switch; an operation button; a press portion that projects out from a length direction central portion of a button back face on a switch side of the operation button; a bearing portion that is provided along a length direction of the operation button inside the case, and that faces the button back face; and a stopper rib that projects out from the button back face, that is disposed along the length direction of the operation button at one side in a transverse direction of the operation button relative to the press portion, that faces the bearing portion, and that has a projection length from the button back face at a length direction end portion side of the operation button that is shorter than a projection length from the button back face at a length direction central portion of the operation button.

20 Claims, 17 Drawing Sheets

(56) References Cited

U.S. PATENT DOCUMENTS

| | | | | |
|---|---|---|---|---|
| 2014/0069790 A1* | 3/2014 | Ely | .................. | H01H 13/14 200/5 A |
| 2014/0069794 A1* | 3/2014 | Lin | .................. | H01H 13/705 200/529 |
| 2014/0071050 A1 | 3/2014 | Armstrong-Muntner | | G06F 3/042 345/158 |
| 2014/0102871 A1* | 4/2014 | Ueno | .................. | H01H 13/14 200/521 |
| 2014/0104768 A1* | 4/2014 | Yang | .................. | G06F 1/1692 361/679.02 |
| 2014/0116865 A1* | 5/2014 | Leong | .................. | G06F 3/0202 200/344 |
| 2014/0306911 A1* | 10/2014 | Zadesky | .................. | G06F 3/0338 345/173 |
| 2014/0313648 A1* | 10/2014 | Yang | .................. | G06F 1/169 361/679.01 |
| 2015/0009156 A1* | 1/2015 | Hsueh | .................. | G06F 3/0202 345/173 |
| 2015/0049059 A1* | 2/2015 | Zadesky | .................. | G06F 1/1613 345/174 |
| 2015/0084898 A1* | 3/2015 | Ishikawa | .................. | G06F 1/169 345/173 |
| 2015/0091870 A1* | 4/2015 | Ciesla | .................. | G06F 3/0202 345/174 |
| 2015/0160750 A1* | 6/2015 | Wu | .................. | G06F 3/016 345/173 |
| 2015/0169117 A1* | 6/2015 | Ho | .................. | H01H 3/12 345/173 |
| 2015/0185779 A1* | 7/2015 | Doi | .................. | G10K 11/002 361/679.1 |
| 2015/0253891 A1* | 9/2015 | Westerman | .................. | G06F 3/03547 345/173 |
| 2015/0261329 A1* | 9/2015 | Chang | .................. | G06F 3/03547 345/166 |
| 2015/0277562 A1* | 10/2015 | Bard | .................. | G06F 3/016 345/177 |
| 2016/0098107 A1* | 4/2016 | Morrell | .................. | G06F 3/044 345/173 |
| 2016/0139637 A1* | 5/2016 | Doi | .................. | G06F 1/1679 361/679.4 |
| 2016/0147328 A1* | 5/2016 | Doi | .................. | G06F 1/169 345/157 |
| 2016/0313795 A1* | 10/2016 | Muramatsu | .................. | H01L 41/0986 |
| 2016/0313819 A1* | 10/2016 | Ancona | .................. | G06F 1/1632 |
| 2016/0313821 A1* | 10/2016 | Bui | .................. | G06F 1/1632 |
| 2016/0313866 A1* | 10/2016 | Pacheco | .................. | G06F 3/0425 |
| 2016/0351360 A1* | 12/2016 | Knopf | .................. | H01H 13/023 |
| 2016/0365204 A1* | 12/2016 | Cao | .................. | H01H 13/704 |
| 2016/0378202 A1* | 12/2016 | Hsieh | .................. | G06F 3/0338 345/161 |
| 2017/0001110 A1* | 1/2017 | Armstrong | .................. | A63F 13/06 |
| 2017/0017267 A1* | 1/2017 | Kitamura | .................. | G06F 1/169 |
| 2017/0038801 A1* | 2/2017 | Lee | .................. | G06F 1/1656 |
| 2017/0069444 A1* | 3/2017 | Wang | .................. | H01H 13/023 |
| 2017/0084406 A1* | 3/2017 | Wang | .................. | G06F 1/169 |
| 2017/0102770 A1* | 4/2017 | Winter | .................. | G06F 3/016 |
| 2017/0153703 A1* | 6/2017 | Yun | .................. | G06F 3/016 |
| 2017/0309096 A1* | 10/2017 | Iyer | .................. | G06F 3/03547 |

* cited by examiner

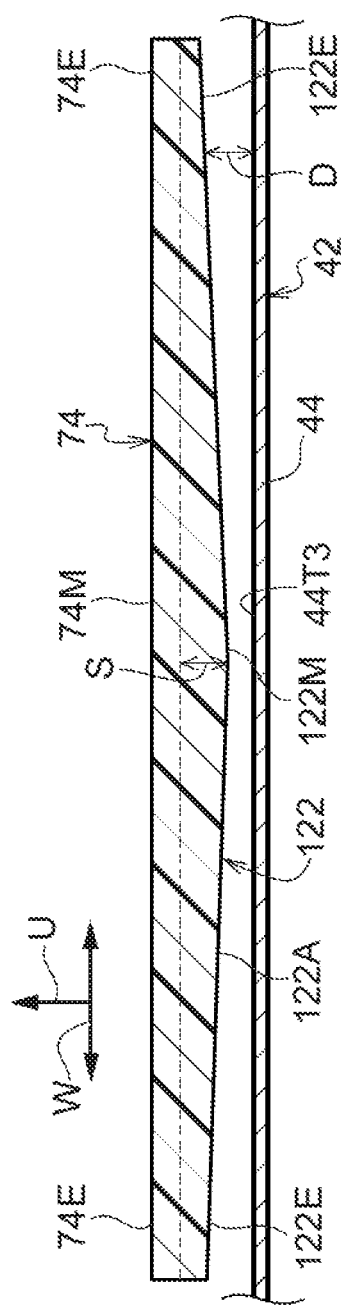

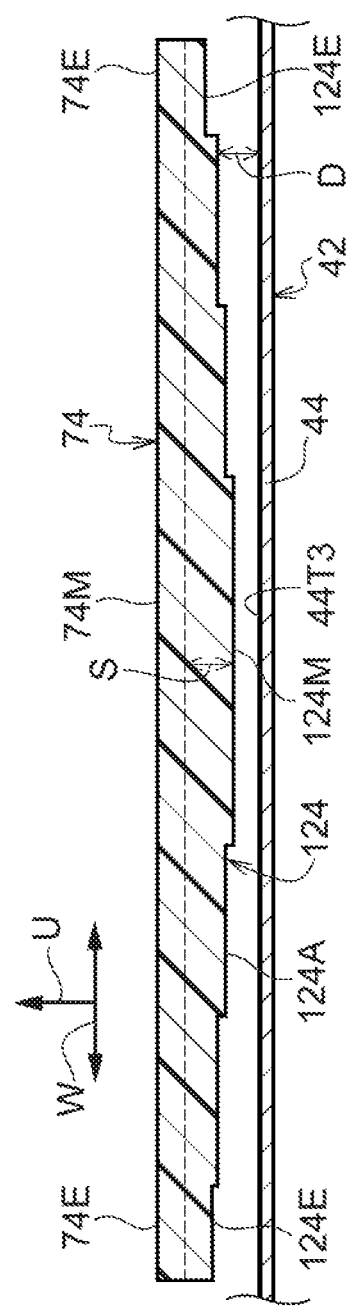

INFORMATION PROCESSING DEVICE

CROSS-REFERENCE TO RELATED APPLICATION

This application is based upon and claims the benefit of priority of the prior Japanese Patent Application No. 2015-162186, filed on Aug. 19, 2015, the entire contents of which are incorporated herein by reference.

FIELD

The embodiments discussed herein are related to an information processing device.

BACKGROUND

Information processing devices such as a personal computer provided with a keyboard exist (see, for example, Japanese Laid-open Patent Publication No. 2013-218975). Such keyboards include, for example, a switch provided inside a case of the information processing device, an operation button that faces the switch, and a press portion that projects out from a length direction central portion of the operation button and that presses down the switch when the operation button is pressed down by an operator.

Sometimes, a stopper rib is provided to a back face of an operation button so as to contact a bearing portion inside the case and limit the press-down amount (push-in amount) of the operation button when, for example, the operation button is pressed down by the operator. Such stopper ribs are provided at the back face of the operation button so as to run along the length direction of the operation button.

SUMMARY

According to an aspect of the embodiments, an information processing device includes: a case; a switch that is provided inside the case; an operation button that is provided at the case and that moves toward and away from the switch; a press portion that projects out from a length direction central portion of a button back face on a switch side of the operation button, and that faces the switch; a bearing portion that is provided along a length direction of the operation button inside the case, and that faces the button back face; and a stopper rib that projects out from the button back face, that is disposed along the length direction of the operation button at one side in a transverse direction of the operation button relative to the press portion, that faces the bearing portion, and that has a projection length from the button back face at a length direction end portion side of the operation button that is shorter than a projection length from the button back face at a length direction central portion of the operation button.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15B is a front view illustrating a modified example of the stopper rib illustrated in FIG. 15A; and FIG. 15C is a front view illustrating a modified example of the stopper rib illustrated in FIG. 15A.

DESCRIPTION OF EMBODIMENTS

Explanation follows regarding an exemplary embodiment of technology disclosed herein.

Information Processing Device

Figure 1:
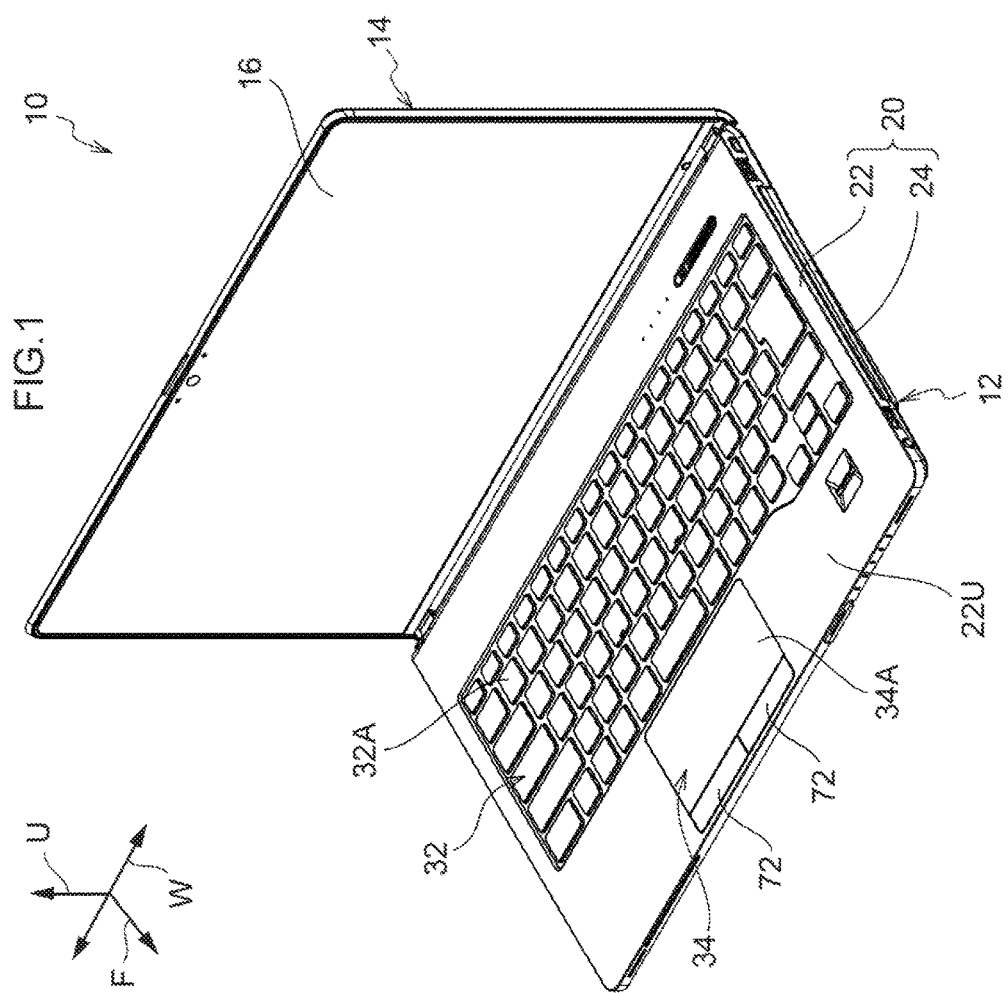
FIG. 1 is a perspective view illustrating an information processing device according to an exemplary embodiment, as viewed from an oblique upper side.

As illustrated in FIG. 1, an information processing device 10 according to the present exemplary embodiment is, for example, configured by a notebook type personal computer. The information processing device 10 includes a main body device (fixed side device) 12, and a display device (movable side device) 14 that is coupled to the main body device 12 so as to be capable of swinging. The display device 14 is, for example, provided with a display 16 such as a liquid crystal display. The display device 14 transitions between a closed state at the main body device 12 side, and an open state away from the main body device 12.

FIG. 1 illustrates the open state, in which the display device 14 is away from the main body device 12. In the respective drawings, the arrow U, the arrow F, and the arrows W respectively indicate a height direction upper side, a depth direction front side (the front-rear direction front side), and a lateral width direction of the information processing device 10.

The main body device 12 includes a case 20. The case 20 is a thin box body, and is formed in a rectangular shape in plan view. The case 20 includes an upper case 22 and a lower case 24 that are partitioned in a thickness direction of the main body device 12 (in the height direction of the information processing device 10).

Figure 2:
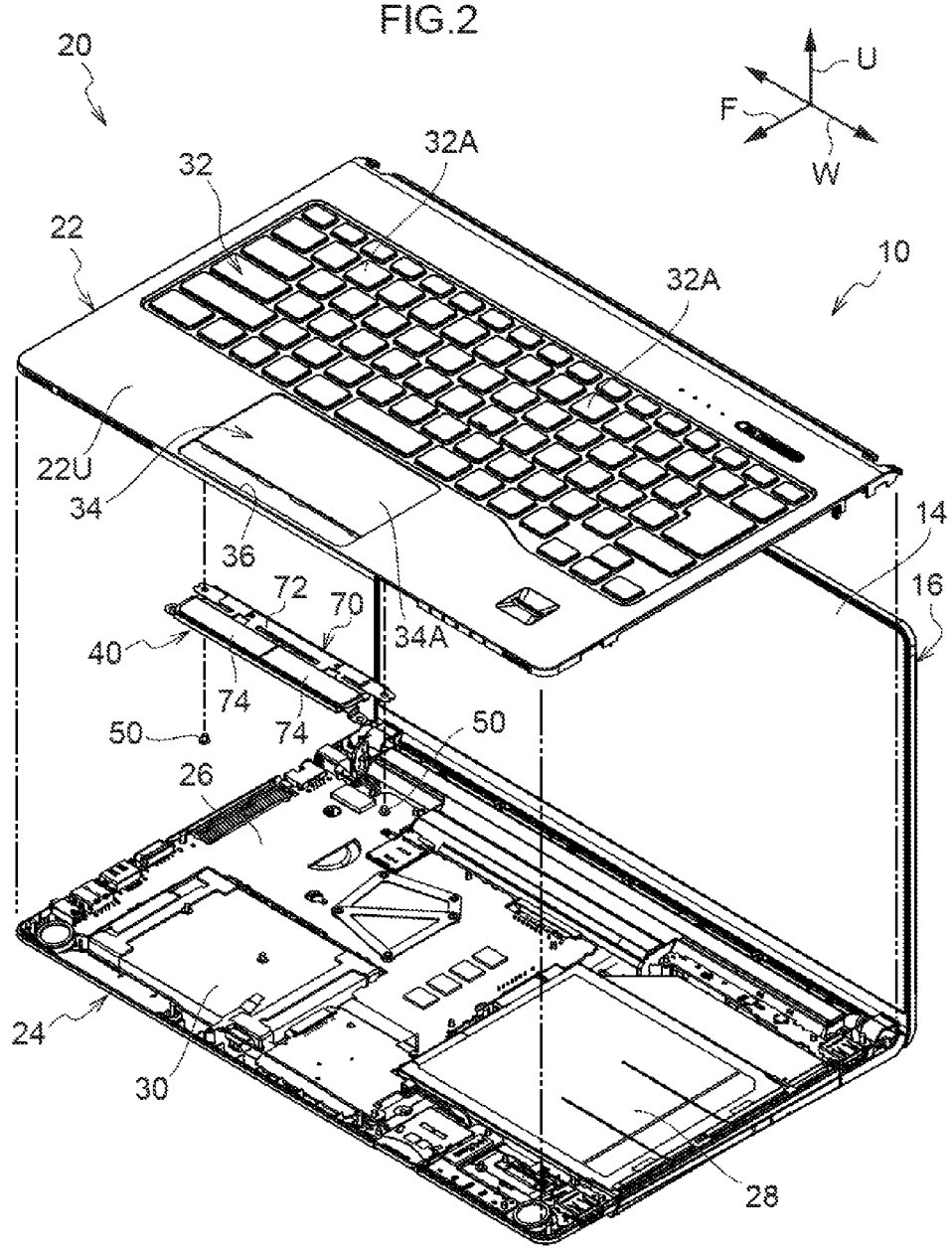
FIG. 2 is an exploded perspective view illustrating the information processing device illustrated in FIG. 1, as viewed from an oblique upper side.

As illustrated in FIG. 2, for example, a printed substrate (main board) 26, an optical disk drive unit 28, and a hard disk drive unit 30 are provided inside the case 20. The case 20 is also provided with a keyboard 32, a touch pad unit 34, a button unit 40, and the like.

The keyboard 32 is formed in a rectangular shape in plan view, and is disposed spanning from a depth direction central portion of the upper case 22 toward the far side. The keyboard 32 includes plural key tops 32A that are exposed from an upper face 22U of the upper case 22. The touch pad unit 34 is disposed at the upper face 22U of the upper case 22 at a front side (the arrow F side) of the keyboard 32. The touch pad unit 34 includes a touch operation face 34A that is operated by a finger of an operator or the like. The touch operation face 34A is formed in a rectangular shape with a length direction in the lateral width direction of the case 20 in plan view, and is exposed from the upper face 22U of the upper case 70.

A button opening 36 that exposes a pair of click buttons 74, described later, is formed in the upper face 22U of the upper case 22 at a front side of the touch pad unit 34. The button, opening 36 is formed in an elongated shape extending along a front side end portion of the touch pad unit 34 in the lateral width direction of the case 20 in plan view.

Button Unit

Figure 3:
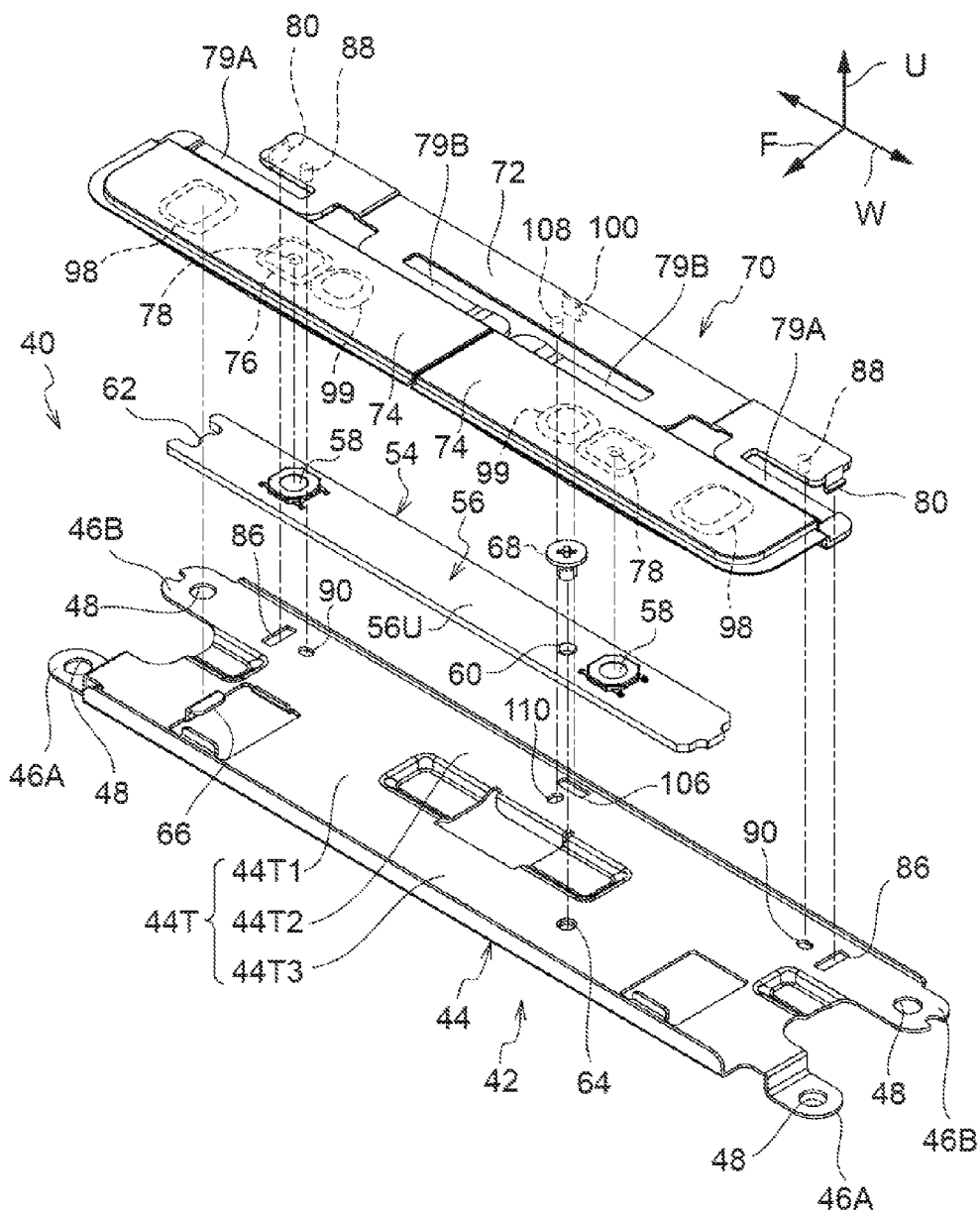
FIG. 3 is an exploded perspective view illustrating a button unit illustrated in FIG. 2, as viewed from an oblique upper side.
Figure 4:
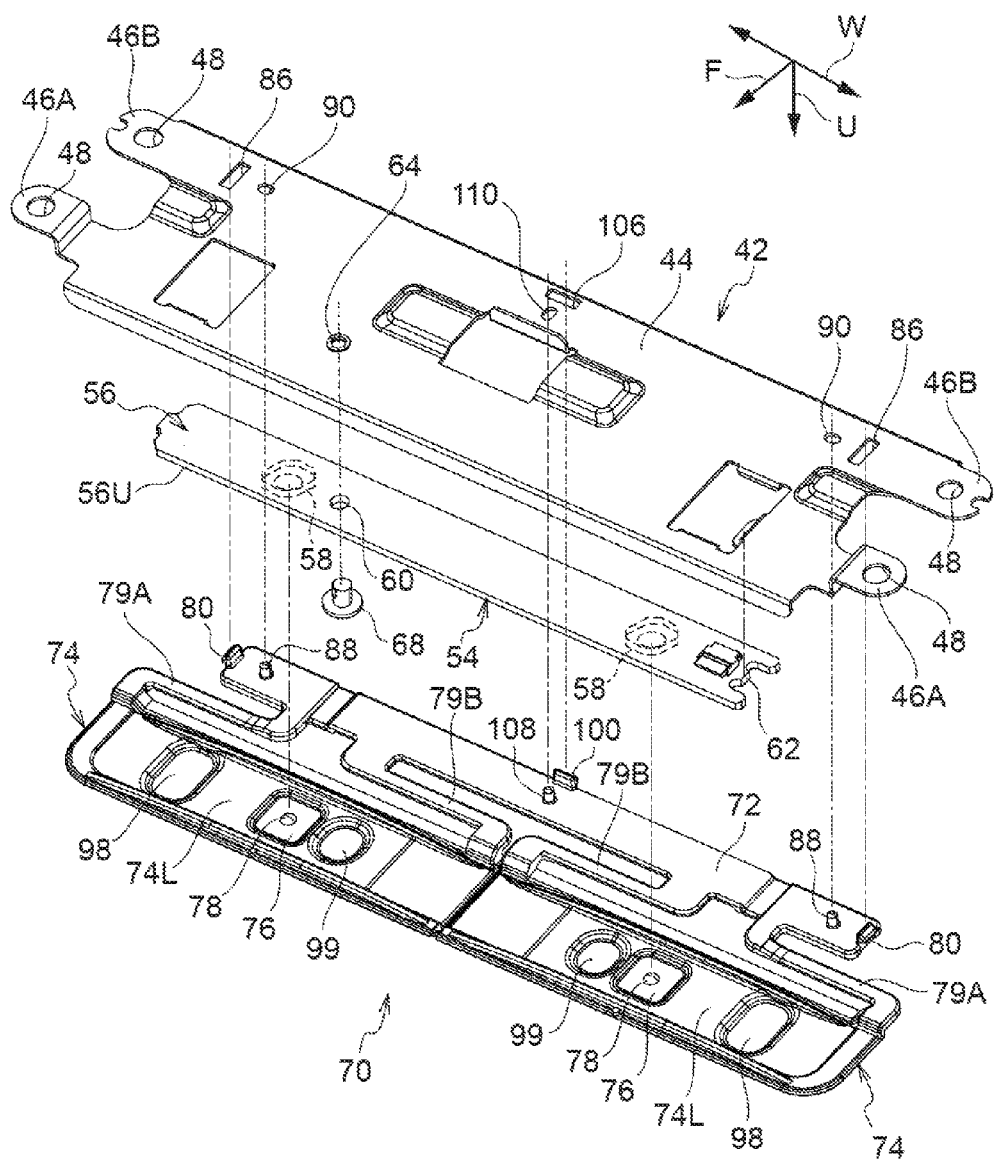
FIG. 4 is an exploded perspective view illustrating the button unit illustrated in FIG. 2, as viewed from an oblique lower side.

The button unit 40 is disposed naming along a front side end portion of the upper case 22. As illustrated in FIG. 3 and FIG. 4, the button unit 40 includes a click base 42, a switch unit 54, and a button member 70. The click base 42 is an example of a base member.

Click Base

The click base 42 is fixed to the upper case 22 by screws 50 (see FIG. 5) in a state in which the switch unit 54 and the button member 70 are assembled to the click base 42. Namely, the switch unit 54 and the button member 70 are fixed to the case 20 through the click base 42.

Specifically, the click base 42 is, for example, made of metal, and is formed in an elongated shape with its length direction running along the lateral width direction of the case 20 (information processing device 10) (the arrow W direction) in plan view. The click base 42 includes a base body portion 44, a pair of front side fixing portions 46A, and a pair of rear side fixing portions 46B.

Figure 5:
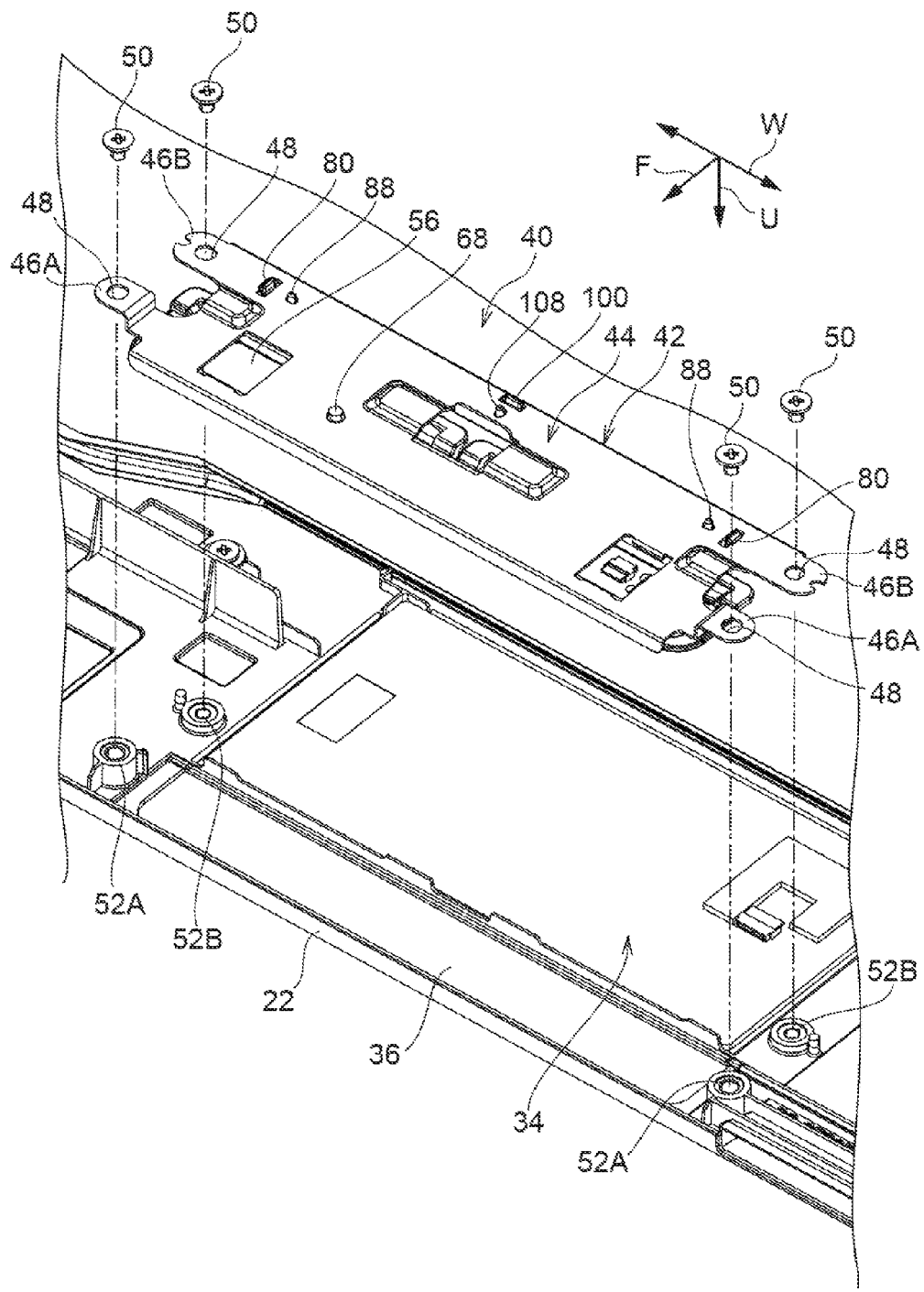
FIG. 5 is an exploded perspective view illustrating an upper case and the button unit illustrated in FIG. 2, as viewed from an oblique lower side.

As illustrated in FIG. 5, the base body portion 44 is disposed spanning between the button opening 36 and the touch pad unit 34 in plan view. The pair of front side fixing portions 46A and the pair of rear side fixing portions 46B are provided at end portions at both sides in the length direction of the base body portion 44. The pair of front side fixing portions 46A and the pair of rear side fixing portions 46B are respectively formed with through holes 48 that are penetrated by the screws 50.

The upper case 22 is provided with a pair of front side boss portions 52A and a pair of rear side boss portions 52B.

The pair of front side boss portions 52A are disposed at both sides in the length direction of the button opening 36. The pair of rear side boss portions 52B are disposed at both sides in the length direction of the touch pad unit 34. The pair of front side fixing portions 46A and the pair of rear side fixing portions 46B are respectively fixed to the pair of front side boss portions 52A and the pair of rear side boss portions 52B by the screws 50. Note that as an example, the pair of front side fixing portions 46A of the present exemplary embodiment are fixed to the pair of front side boss portions 52A together with the lower case 24 (see FIG. 2) by the screws 50.

As illustrated in FIG. 3, the base body portion 44 is formed in a flat plate shape. An opposing face 44T on the button member 70 side of the base body portion 44 is provided with a switch fixing region 44T1 to which the switch unit 54 is fixed, and a button fixing region 44T2 to which a button base 72 is fixed.

Switch Unit

The switch unit 54 includes switch substrate 56 and a pair of switches 58. The switch substrate 56 is formed in an elongated shape extending along the length direction of the click base 42. The switch substrate 56 is disposed along the switch fixing region 44T1 of the opposing face 44T. One end side in the length direction of the switch substrate 56 is formed with a fixing hole 60 that is penetrated by a screw 68. A projection portion 62 is provided at the other end side in the length direction of the switch substrate 56.

A screw hole 64 is formed at one end side in the length direction of the switch fixing region 44T1. A hook shaped hooking portion 66 is formed at the other end side in the length direction of the switch fixing region 44T1. The switch substrate 56 overlaps with the click base 42 in a state in which the projection portion 62 of the switch substrate 56 is hooked by the hooking portion 66. In this state, the screw 68 is passed through the fixing hole 60 in the switch substrate 56 and fastened to the screw hole 64. The switch substrate 56 is thereby fixed to the switch fixing region 44T1.

The pair of switches 58 are mounted to a mounting face 56U on the opposite side of the switch substrate 56 from the click base 42 (on the upper case 22 side). The pair of switches 58 are disposed spaced apart along the length direction of the switch substrate 56, and are disposed facing press portions 78 of the pair of click buttons 74, described later.

The respective switches 58 are, for example, configured by tactile switches such as dome switches. Specifically, the respective switches 58 include reverse springs, fixed contact points, and movable contact points, for example. The reverse springs rebound in conjunction with a push-down operation by the operator, thereby imparting the operator with a clicking sensation. The movable contact points are provided to the reverse springs. The movable contact points contact the fixed contact points in conjunction with the push-down operation of the operator. The switches 58 thereby adopt an ON state (a current flow state). When the movable contact points separate from the fixed contact points, the switches 58 adopt an OFF state (a non-current flow state). The pair of switches 58 are electrically connected to the printed substrate (main board) described above, for example through a cable, not illustrated in the drawings, that is connected to the switch substrate 56.

Button Member

The button member 70 includes a button base 72, the pair of click buttons 74, and plural support arms 79A, 79B. The button base 72, the pair of click buttons 74, and the plural support arms 79A, 79B are, for example, integrally formed from a resin with elastic properties (rubber-like properties). The button base 72 is formed in an elongated shape extending along the length direction of the click base 42, and is fixed to the button fixing region 44T2 of the click base 42.

Specifically, as illustrated in FIG. 4, the click base 42 and the button member 70 are assembled in a mutually superimposed state. A pair of first claw shaped members 80 extending out toward the click base 42 side are provided at end portions at both sides in the length direction of the button base 72. The pair of first claw shaped members 80 are inserted into first attachment holes 86 formed at both sides in the length direction of the click base 42. The pair of first claw shaped members 80 are anchored to edge portions of the first attachment holes 86, thereby fixing the end portions on both sides in the length direction of the button base 72 to the click base 42.

A second claw shaped member 100 extending out toward the click base 42 side is provided at a length direction central portion of the button base 72, at an end portion on the opposite side of the button base 72 from the pair of click buttons 74. The second claw shaped member 100 is inserted into a second attachment hole 106 formed in a length direction central portion of the click base 42. The second claw shaped member 100 is anchored to an edge portion of the second attachment hole 106, thereby fixing the length direction central portion of the button base 72 to the click base 42.

The button base 72 is provided with a pair of first positioning protrusions 88 and a second positioning protrusion 108 that position the button member 70 with respect to the click base 42. The pair of first positioning protrusions 88 and the second positioning protrusion 108 are respectively inserted into a pair of first positioning holes 90 and a second positioning hole 110 that are formed in the click base 42, thereby positioning the button base 72 with respect to the click base 42.

As illustrated in FIG. 3, the pair of click buttons 74 are disposed in a row along the length direction of the click base 42, and are formed in elongated shapes extending along the length direction of the click base 42. The pair of click buttons 74 oppose the switch fixing region 44T1 of the click base 42, with the switch unit 54 interposed therebetween.

Figure 6:
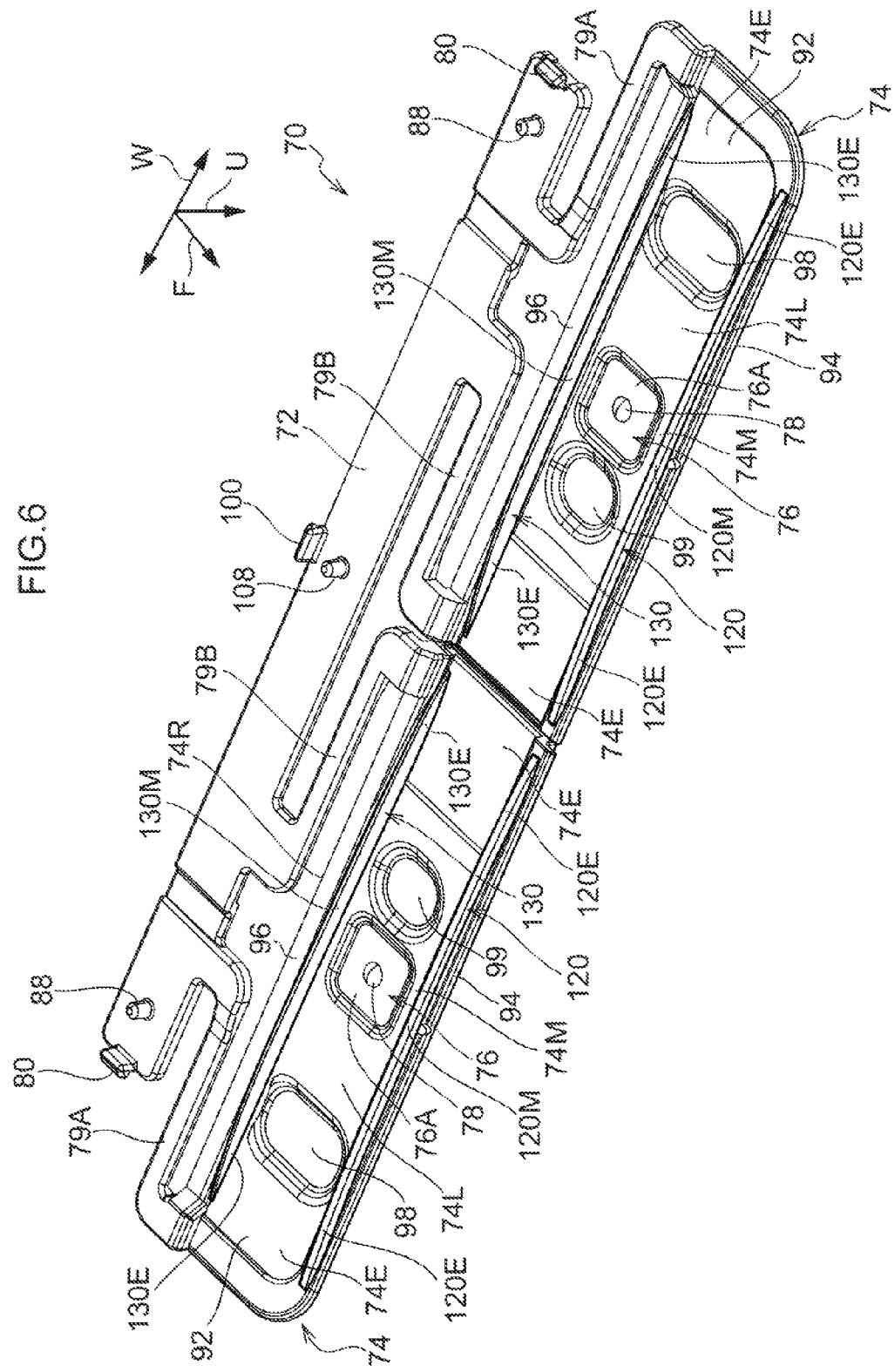
FIG. 6 is an enlarged perspective view illustrating a button member illustrated in FIG. 4.
Figure 7:
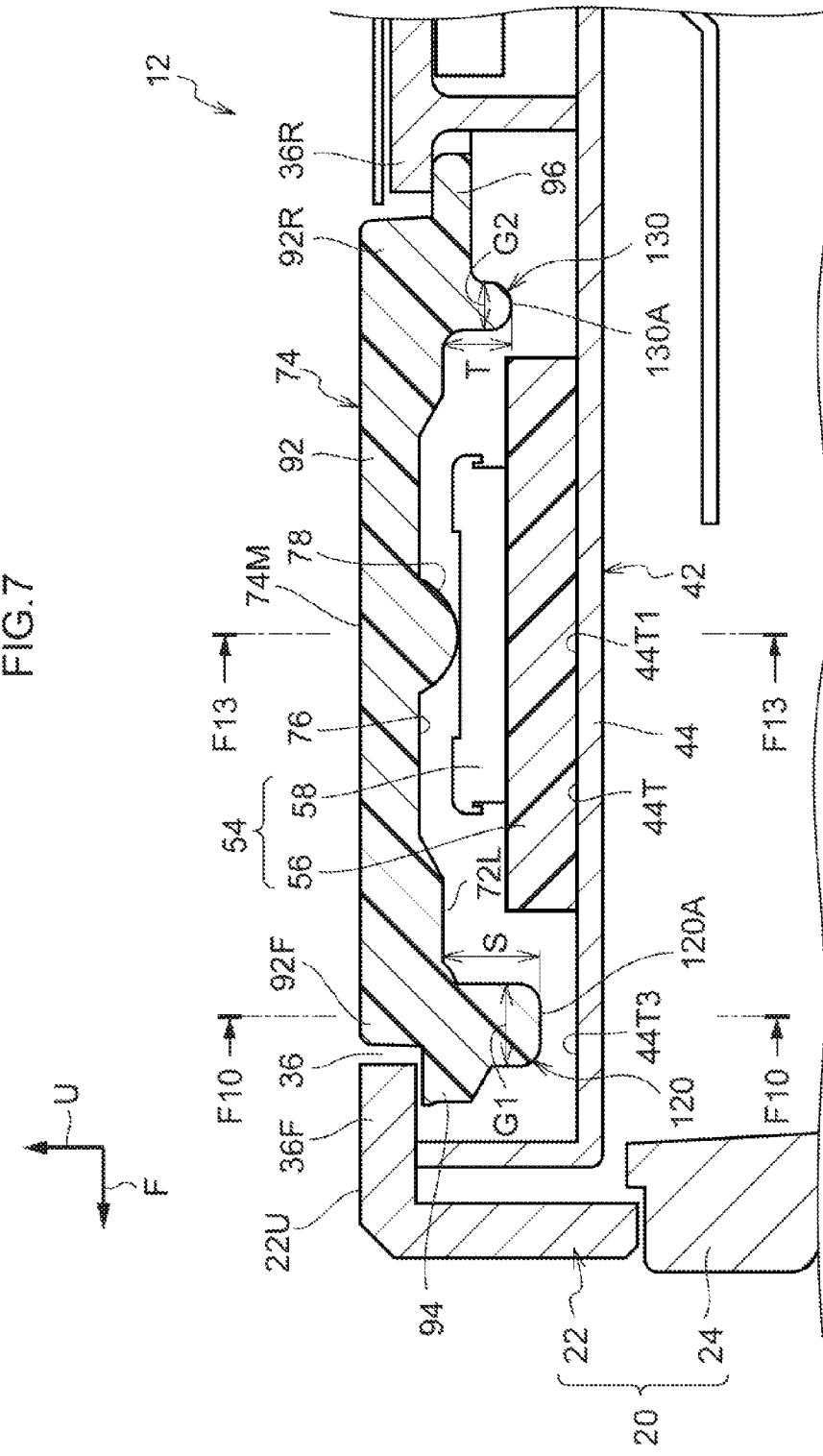
FIG. 7 is a cross-section taken along line F7-F7 in FIG. 10.

As illustrated in FIG. 6, each of the click buttons 74 includes a button main body portion 92, one end side flange portion 94, and another end side flange portion 96. As illustrated in FIG. 7, the button main body portion 92 is disposed inside the button opening 36 of the upper case 22, and is exposed from the upper face 22U of the upper case 22.

The one end side flange portion 94 is provided along one transverse direction end portion 92F of the button main body on 92. The one end side flange portion 94 juts out from the one transverse direction end portion 92F of the button main body portion 92 toward the outside (the front side), and is disposed at a lower side (the case 20 inside) of a front side edge portion 36F of the button opening 36. The one end side flange portion 94 contacts the front side edge portion 36F of the button opening 36, thereby suppressing the click button 74 from lifting upward through the button opening 36. A gap between the button main body portion 92 and the front side edge portion 36F of the button opening 36 is closed off by the one end side flange portion 94. This thereby improves styling peripheral to the click buttons 74.

The other end side flange portion 96 is provided along another transverse direction end portion 92R of the button main body portion 92. The other end side flange portion 96 juts out from the other transverse direction end portion 92R of the button main body portion 92 toward the outside (the rear side), and is disposed at a lower side (the case 20 inside) of a rear side edge portion 36R of the button opening 36. The other end side flange portion 96 contacts the rear side edge portion 36R of the button opening 36, thereby suppressing the click button 74 from lifting upward through the button opening 36. A gap between the button main body portion 92 and the rear side edge portion 36R of the button opening 36 is closed off by the other end side flange portion 96. This thereby improves styling peripheral to the click buttons 74.

As illustrated in FIG. 6, each of the click buttons 74 is corrected to the button base 72 through a pair of the support arms 79A, 79B. Each pair of support arms 79A, 79B extends out from the button base 72 toward the click button 74 side, and is connected to the other end side (the rear side) in the transverse direction of the respective click button 74. The respective click buttons 74 are supported in a cantilevered state by the button base 72 through the pairs of support arms 79A, 79B. Note that the pairs of support arms 79A, 79B are an example of an elastic support portion.

The pairs of support anus 79A, 79B elastically deform along the direction in which the pair of click buttons 74 and the click base 42 face each other (the height direction of the information processing device 10). The press portions 78 of the respective click buttons 74 move toward and away from the switches 58 in conjunction with the elastic deformation of the pairs of support arms 79A, 79B. When this is performed, the central portions of the switches 58 are pressed down by the press portions 78 of the click buttons 74 described later.

Moreover, as illustrated in FIG. 4 and FIG. 6, a button back face 74L on the switch 58 side of each click button 74 (button main body portion 92) is formed with a switch recess 76, a booking portion recess 98, and a screw recess 99, for reducing the thickness of the case 20. The switch recess 76, the hooking portion recess 98, and the screw recess 99 are disposed in a row along the length direction of the click button 74.

Specifically, the rectangular shaped switch recesses 76 are formed facing the switches 58 at a length direction central portion of the button back face 74L of each click button 74. The press portions 78 are provided at a central portion of a bottom wall 76A (see FIG. 6) of each switch recess 76. The press portions 78 project out in a mound shapes from the bottom walls 76A of the switch recesses 76, and face central portions of the switches 58. Portions of the switches 58 are disposed in the switch recesses 76 in conjunction with movement of the click button 74 toward and away from the switches 58. When this occurs, the central portions of the switches 58 are pressed down by the press portions 78.

The rectangular shaped hooking portion recesses 98 are formed at one side of the switch recess 76 on the button back face 74L of each click button 74, so as to face the hooking portion 66 of the click base 42. The screw recesses 99 are formed at the other side of the switch recess 76 on the button back face 74L of each click button 74, so as to face a head portion of the screw 68. Portions of the hooking portion 66 and the screw 68 are respectively disposed inside the hooking portion recess 98 and the screw recess 99 in conjunction with movement of the click buttons 74 toward and away from the switches 58.

Note that in the present exemplary embodiment, the pair of click buttons 74 are formed with symmetry to each other about a length direction central portion of the button member 70 in order to give the pair of click buttons 74 equivalent strength. Accordingly, one of the click buttons 74 out of the pair of click buttons 74 is formed with a hooking portion recess 98 that regulates the strength and does not face the hooking portion 66. Similarly, the other click button 74 out of the pair of click buttons 74 is formed with a screw recess 99 that regulates the strength and does not face the head portion of the screw 68.

Operation Button Reinforcement and Press-Down Amount Limiting Structure

Next, explanation follows regarding an example of a reinforcement-cum-press-down amount limiting structure of the pair of click buttons 74. As illustrated in FIG. 6, the button back face 74L of each click button 74 is provided with a stopper rib 120 and a reinforcement rib 130 that reinforce the click button 74. The stopper ribs 120 and the reinforcement ribs 130 project out from the button back faces 74L of the click buttons 74, and are provided spanning from one end portion 74E side to another end portion 74E side in the length direction of each click button 74.

The stopper ribs 120 are disposed along the length direction of the click buttons 74 at one side in the transverse direction of the click buttons 74 with respect to the press portions 78 (on the opposite side to the support arms 79A, 79B). The reinforcement ribs 130 are disposed along the length direction of the click buttons 74 at the other side in the transverse direction of the click buttons 74 with respect to the press portions 78 (on the side of the support arms 79A, 79B). The stopper ribs 120 face the reinforcement ribs 130 in the transverse direction of the click buttons 74 along their entire lengths in their respective length directions.

Stopper Rib

Figure 8:
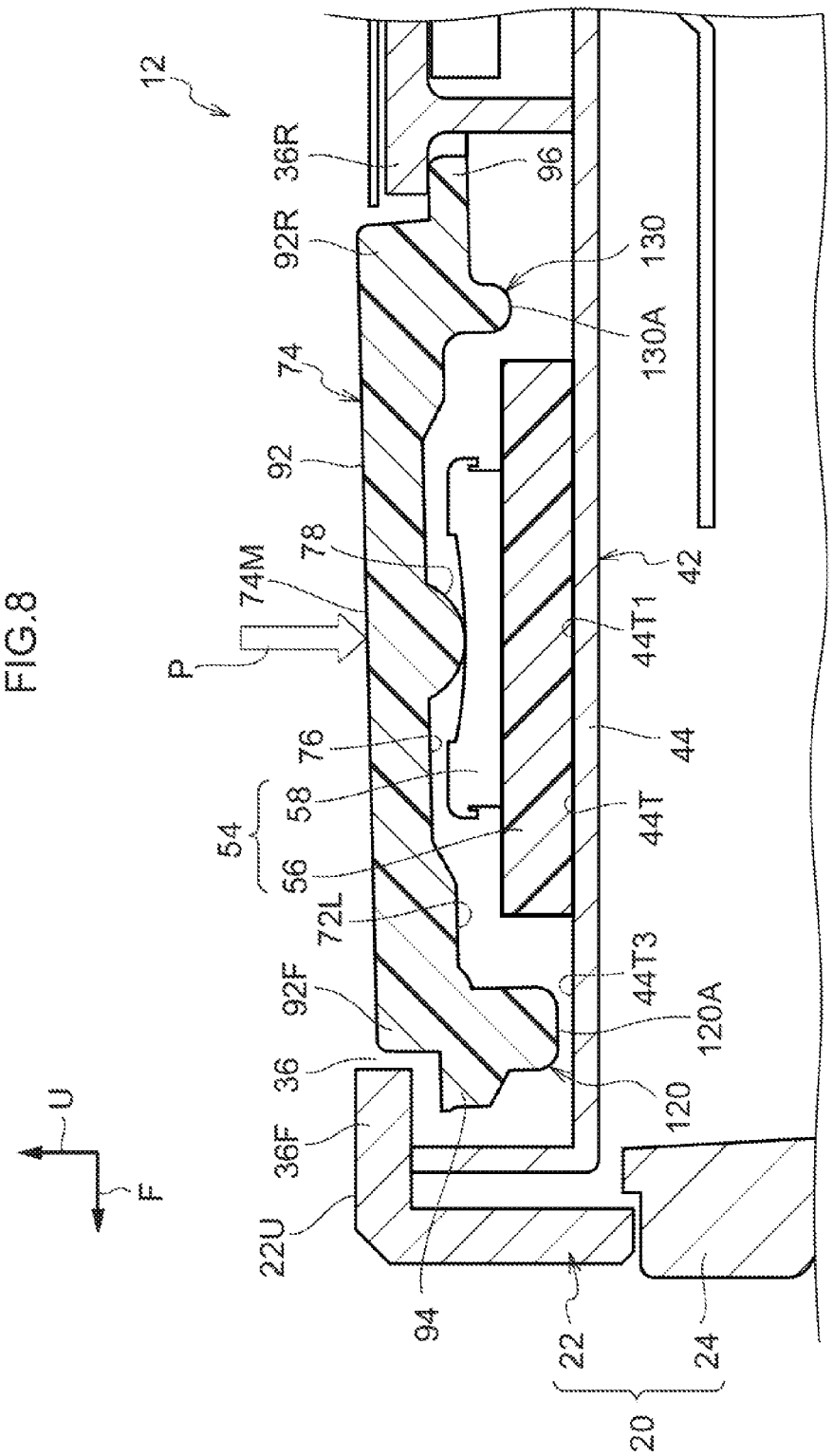
FIG. 8 is a cross-section corresponding to FIG. 7, illustrating a state in which a click button has been pressed down by an operator.
Figure 9:
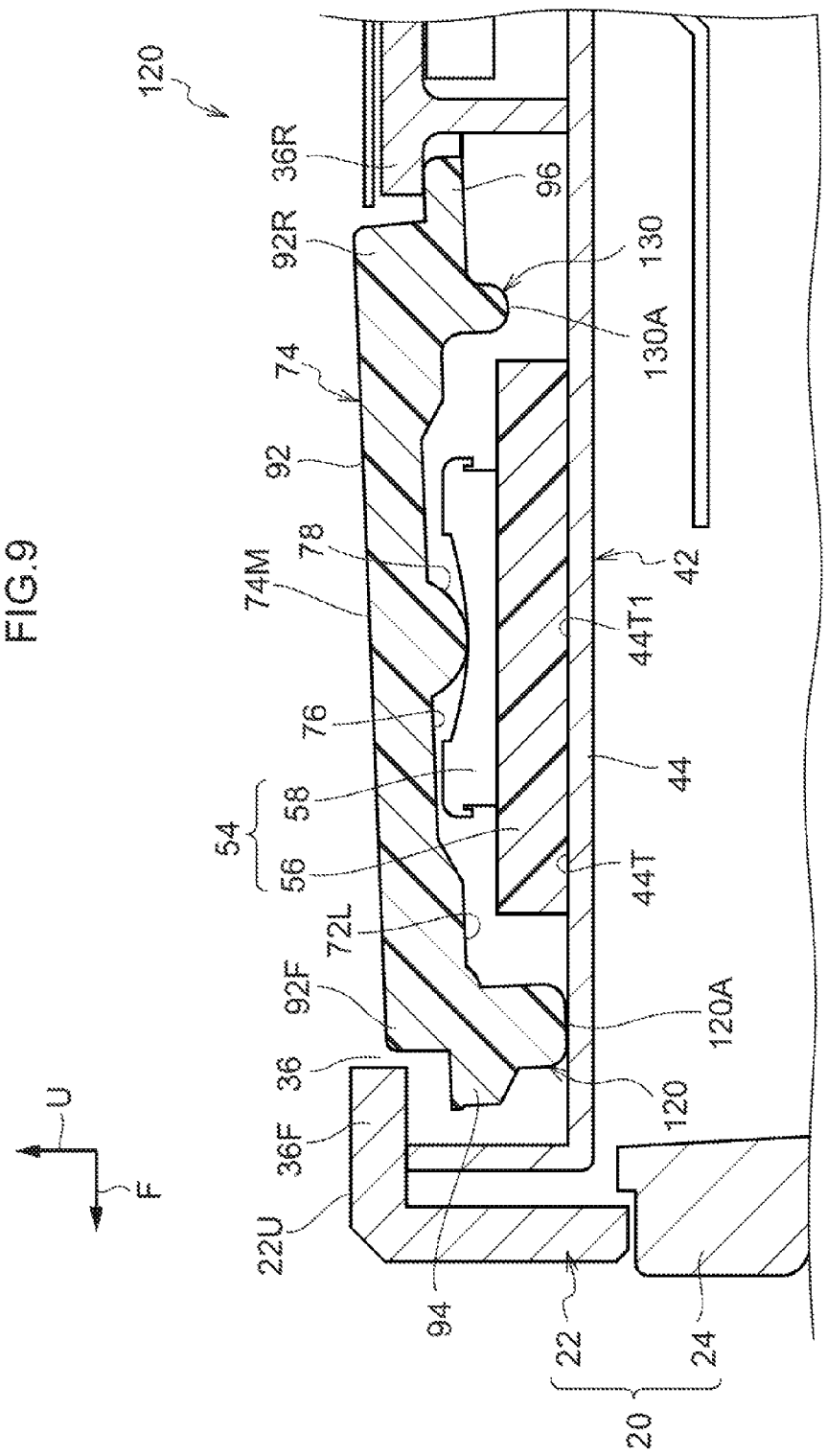
FIG. 9 is a cross-section corresponding to FIG. 7, illustrating a state in which a click button has been pressed down by an operator, and a projection direction leading end portion of a stopper rib has contacted a bearing portion of a click base.

As illustrated in FIG. 7, FIG. 8, and FIG. 9, each stopper rib 120 projects out from the one end side flange portion 94 at the opposite side of the switch substrate 56 from the support arms 79A, 79B (the front side). A leading end portion 120A in the projection direction of each stopper rib 120 faces the opposing face 141 of the base body portion 44 of the click base 42.

Note that a region further to the front side than the switch fixing region 44T1 of the opposing face 44T of the base body portion 44 (than the switch unit 54) configures a bearing portion 44T3 that faces the leading end portions 120A of the stopper ribs 120. The bearing portion 44T3 is formed in the same plane as the switch fixing region 44T1. The bearing portion 44T3 is contacted by the leading end portions 120A of the stopper ribs 120 when an operator presses down the respective click buttons 74. A press-down amount of the click buttons 74 by the operator is accordingly limited. Namely, the stopper ribs 120 function not only to reinforce the click buttons 74, but also as stoppers to limit the press-down amount of the click buttons 74.

Figure 10:
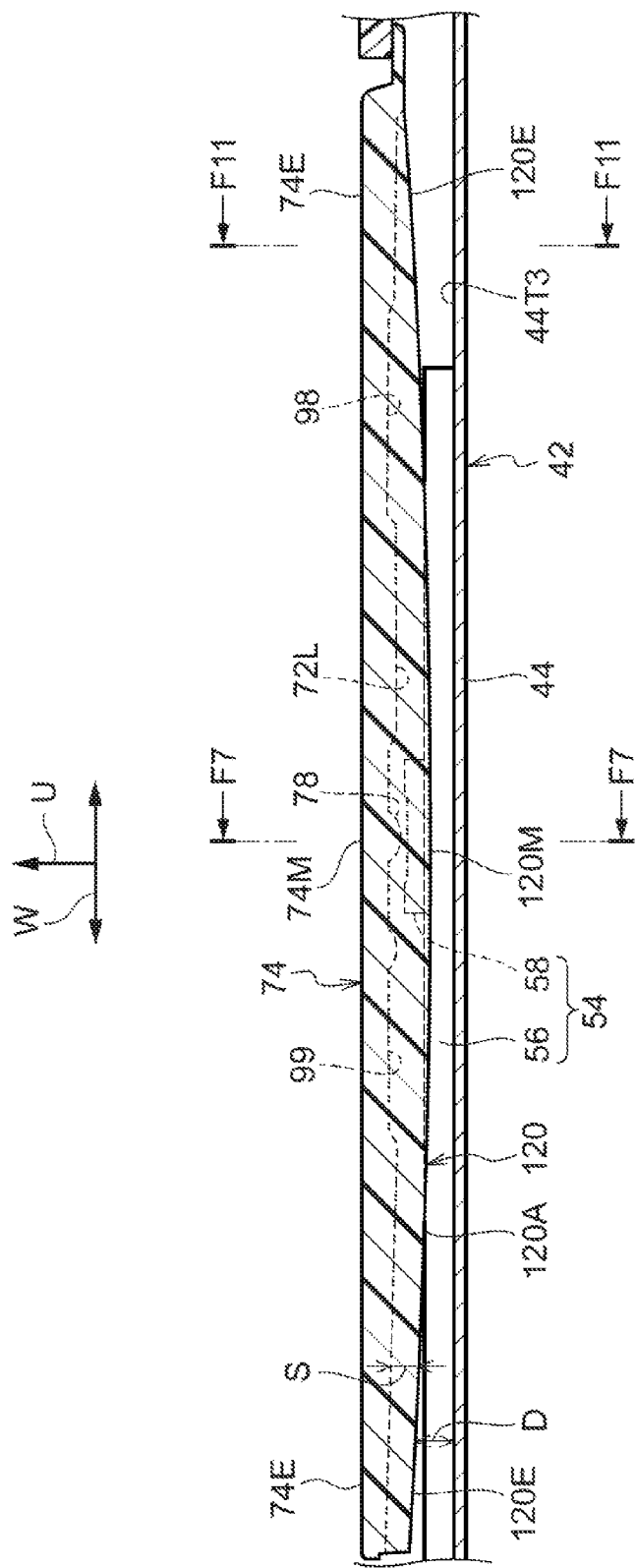
FIG. 10 is a cross-section taken along line F10-F10 in FIG. 7.

As illustrated in FIG. 10, as viewed along the transverse direction of the click button 74, the leading end portion 120A of each stopper rib 120 curves in a shape protruding toward the opposite side from the click button 74. Namely, a projection length S of the stopper rib 120 from the button back face 74L of the click button 74 becomes shorter on progression from a length direction central portion 120M toward end portions 120E on both sides in the length direction of the click button 74. Accordingly, a spacing D between the leading end portion 120A of the stopper rib 120 and the bearing portion 44T3 of the click base 42 is wider at the sides of the length direction end portions 74E of the click button 74 than at a length direction central portion 74M of the click button 74.

Reinforcement Rib

As illustrated in FIG. 7, each reinforcement rib 130 projects out from the other end side flange portion 96 at the same side of the switch substrate 56 as the pair of support arms 79A, 79B (the rear side). A leading end portion 130A in the projection direction of each reinforcement rib 130 faces the opposing face 44T of the base body portion 44 of the click base 42.

Note that each click button 74 is supported in a cantilevered state by the pair of support arms 79A, 79B. Accordingly, when the click button 74 is pressed down by the operator, as illustrated in FIG. 8 and FIG. 9, a movement amount (depression amount) of the click button 74 is greater at the stopper rib 120 side than at the reinforcement rib 130 side. Accordingly, when the click button 74 is pressed down by the operator, the leading end portion 120A of the stopper rib 120 contacts the bearing portion 44T3 of the click base 42 before the leading end portion 130A of the reinforcement rib 130 contacts the click base 42.

As illustrated in FIG. 6, similarly to the stopper ribs 120, as viewed along the transverse direction of the click buttons 74, the leading end portion 130A of each reinforcement rib 130 curves in a shape protruding toward the opposite side from the click button 74. Namely, a projection length T (see FIG. 7) of the reinforcement rib 130 from the button back face 74L of the click button 74 becomes shorter on progression from a length (Erection central portion 130M toward end portions 130E on both sides in the length direction of the click button 74. Accordingly, similarly to the stopper ribs 120, a spacing between the leading end portion 130A of the reinforcement rib 130 and the click base 42 is wider at the length direction end portions 74E of the click button 74 than at the length direction central portion 74M of the click button 74.

Moreover, the reinforcement ribs 130 are configured with lower rigidity (lower strength) than the stopper ribs 120. In other words, the stopper ribs 120 are configured with higher rigidity (higher strength) than the reinforcement ribs 130. Specifically, as illustrated in FIG. 7, the projection length T of each reinforcement rib 130 is shorter than the projection length S of the stopper rib 120 along the entire length direction length of the reinforcement rib 130. Accordingly, for example, the projection length T of the reinforcement rib 130 is shorter than the projection length S of the stopper rib 120 at the length direction central portion 74M of the click button 74. Similarly, as illustrated in FIG. 11, the projection length T of the reinforcement rib 130 is shorter than the projection length S of the stopper rib 120 at the length direction end portions 74E of the click button 74.

Figure 11:
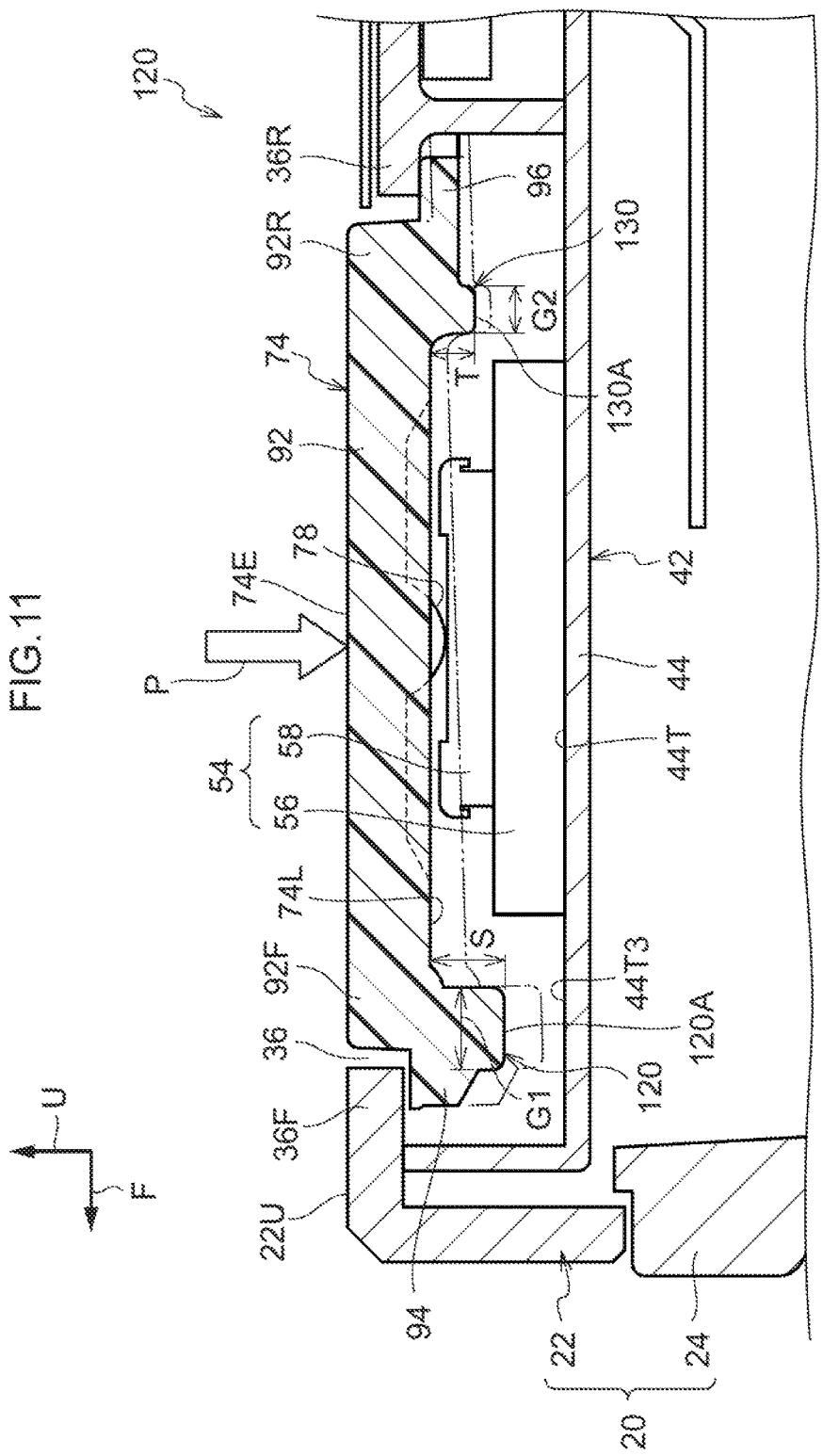
FIG. 11 is a cross-section taken along line F11-F11 in FIG. 10.

In the present exemplary embodiment, as illustrated in FIG. 7 and FIG. 11, a thickness G2 of the reinforcement rib 130 is thinner than a thickness G1 of the stopper rib 120 along the entire length direction length of the reinforcement rib 130. Accordingly, the bending rigidity (bending rigidity in the thickness direction of the click button 74) of the reinforcement rib 130 is lower than the bending rigidity of the stopper rib 120. As a result, the bending rigidity of the other end side (the other end portion 92R side) in the transverse direction of the click button 74 is lower than the bending rigidity of the one end side (the one end portion 92F side) in the transverse direction of the click button 74.

Next, explanation follows regarding operation and advantageous effects of the present exemplary embodiment.

As illustrated by the arrow P in FIG. 8, when for example, the click button 74 is pressed toward the click base 42 side by a finger of the operator, the pair of support arms 79A, 79B (see FIG. 6) elastically deform. The click button 74 approaches the switch 58 in conjunction with the elastic deformation of the pair of support arms 79A, 79B, and a central portion of the switch 58 is pressed down by the press portion 78 of the click button 74. The switch 58 is thereby switched from the OFF state to the ON state.

Here, in a state in which the switch 58 has been pressed down by the press portion 78, if the operator were to press the click button 74 down further, there would be a possibility of damage to the click button 74, the switch unit 54, and the like.

Figure 12:
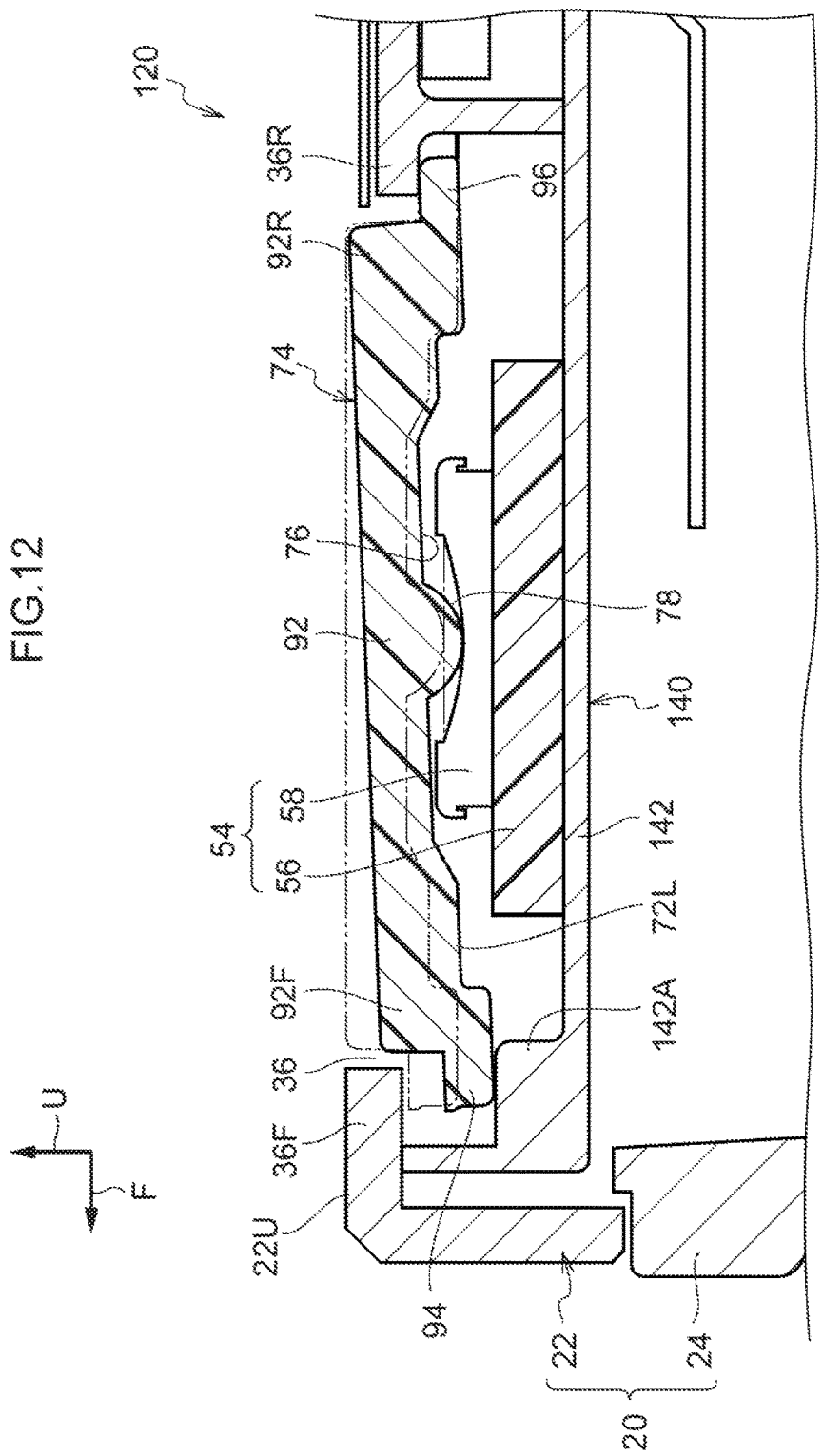
FIG. 12 is a cross-section corresponding to FIG. 9, illustrating an information processing device according to a comparative example.

As a countermeasure to this issue, for example, in a comparative example illustrated in FIG. 12, a base body portion 142 of a resin click base 140 is formed with a shelf portion 142A projecting out toward the one end side flange portion 94 side. In such a configuration, if the operator presses the click button 74 down further from a state in which the switch 58 has been pressed down by the press portion 78, the one end side flange portion 94 of the click button 74 contacts the shelf portion 142A. The press-down amount of the click button 74 is accordingly limited, thereby suppressing damage to the click button 74 and the like. However, in this comparative example, forming the shelf portion 142A to the base body portion 142 makes the structure of the click button 74 and the like more complicated.

In contrast, in the present exemplary embodiment, as illustrated in FIG. 8, the stopper rib 120 is provided at the one end side in the transverse direction of the click button 74 (the one end portion 92F side). The stopper rib 120 projects out from the one end side flange portion 94 and faces the bearing portion 44T3 of the base body portion 44 of the click base 42. If the operator presses the click button 74 down further from a state in which the switch 58 has been pressed down by the press portion 78, as illustrated in FIG. 9, the leading end portion 120A of the stopper rib 120 contacts the bearing portion 44T3. The press-down amount of the click button 74 is accordingly limited, thereby suppressing damage to the click button 74 and the like.

In the present exemplary embodiment, the bearing portion 44T3 is configured by part of the opposing face 44T of the base body portion 44. Accordingly, in the present exemplary embodiment, the structure of the click base 42 is simpler than in the click base 140 according to the comparative example. Manufacturing costs of the click base 42 are accordingly reduced in the present exemplary embodiment.

In the present exemplary embodiment, the structure of the click base 42 is simplified, enabling the click base 42 to be manufactured from a metal, facilitating strengthening, example. Moreover, the shelf portion 142A (see FIG. 12) as in the comparative example is not present on the click base 42 of the present exemplary embodiment. The present exemplary embodiment thereby enables the projection length S of the stopper rib 120 to be made longer than in the comparative example. This thereby enables the press-down amount of the click button 74 to be limited while raising the rigidity of the one end side (the one end portion 92F side) in the transverse direction of the click button 74 in the present exemplary embodiment.

Figure 13:
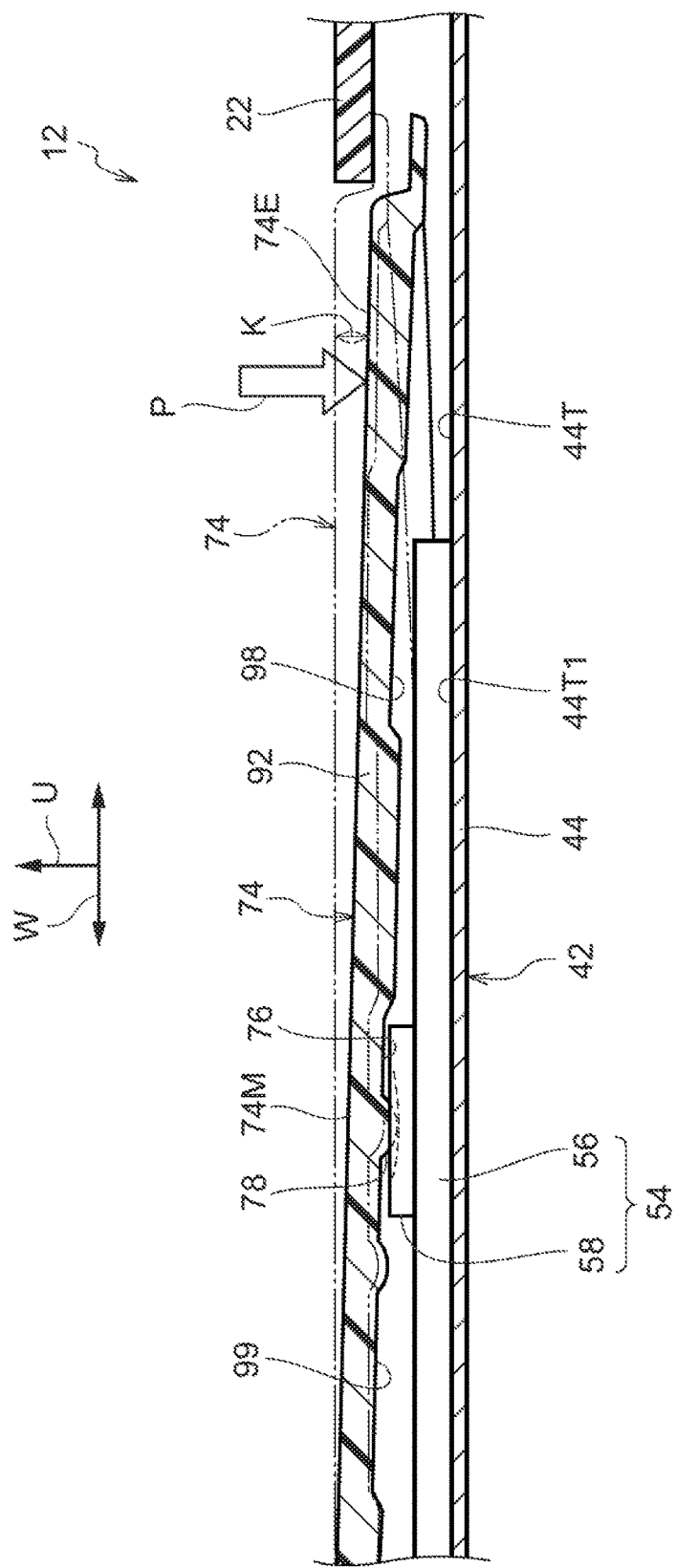
FIG. 13 is a cross-section taken along line F13-F13 in FIG. 7.

Note that the press-down amount of the click button 74 until the switch 58 is pressed down by the press portion 78 varies according to the position that the operator presses down in the length direction of the click button 74. Specifically, for example, as illustrated by the arrow P in FIG. 13, the click button 74 flexes when the operator presses down one of the length direction end portions 74E of the click button 74. The press-down amount (stroke) K of the click button 74 until the switch 58 is pressed down by the press portion 78 increases corresponding to the flex amount of the click button 74. Namely, the press-down amount K of the click button 74 until the switch 58 is pressed down by the press portion 78 is greater at the length direction end portions 74E of the click button 74 than at the length direction central portion 74M of the click button 74.

Accordingly, it is more difficult to press down the switch 58 with the press portion 78 at the length direction end portions 74E of the click button 74, and there is a possibility of the switch 58 operating poorly. There is also a possibility of the operator being unable to obtain a specific operation feel (clicking sensation) at the length direction end portions 74E of the click button 74.

In particular, in the present exemplary embodiment, the switch recess 76 is formed at the length direction central portion 74M of the click button 74, and the thickness of the central portion 74M is thinner than at other locations of the click button 74. Accordingly, when one of the length direction end portions 74E of the click button 74 is pressed down by the operator, there is a possibility of the length direction central portion 74M of the click button 74 bending (buckling) about the press portion 78. When the length direction central portion 74M of the click button 74 bends, the press-down amount K of the click button 74 until the switch 58 is pressed down by the press portion 78 increases yet further.

As a countermeasure to this issue, in the present exemplary embodiment the stopper rib 120 and the reinforcement rib 130 are provided at the button back face 74L of the click button 74. The stopper rib 120 and the reinforcement rib 130 raise the bending rigidity in the thickness direction of the click button 74 (the arrow U direction). Accordingly, when one of the length direction end portions 74E of the click button 74 is pressed down by the operator, the flex amount of the click button 74 is reduced, and the length direction central portion 74M of the click button 74 is suppressed from buckling. The press-down amount K of the click button 74 until the switch 58 is pressed down by the press portion 78 is reduced as a result. Poor operation of the switch 58 at the length direction end portions 74E of the click buttons 74 is thereby suppressed.

Accordingly, the present exemplary embodiment enables poor operation of the switch 58 at the length direction end portions 74E of the click button 74 to be suppressed, while achieving a thinner click button 74. Moreover, the specific operation feel is more readily obtained by the operator at the length direction end portions 74E of the click button 74.

In the present exemplary embodiment, the click button 74 is provided with the stopper rib 120 and the reinforcement rib 130. The present exemplary embodiment thereby reduces the flex amount of the click button 74 in comparison to cases in which the click button 74 is only provided with the stopper rib 120.

The stopper rib 120 and the reinforcement rib 130 of the present exemplary embodiment respectively project out from the button back face 74L of the click button 74 at both sides in the transverse direction of the switch substrate 56. This thereby enables a thinner button unit 40 and case 20 to be achieved, while lengthening the projection lengths S, T of the stopper rib 120 and the reinforcement rib 130.

Moreover, as described above, the press-down amount of the click button 74 until the switch 58 is pressed down by the press portion 78 is greater at the length direction end portions 74E of the click button 74 than at the length direction central portion 74M of the click button 74. The following concern would accordingly arise if, for example, the projection length S of the stopper rib 120 were to be uniform along the entire length of the stopper rib 120.

Namely, when the operator presses down one of the length direction end portions 74E of the click button 74, there is a possibility that the length direction end portion 120E of the stopper rib 120 could contact the bearing portion 44T3 before the switch 58 is pressed down by the press portion 78. In such cases, pressing down the switch 58 with the press portion 78 could become more difficult, causing poor operation of the switch 58.

As a countermeasure to this issue, as illustrated in FIG. 10, in the present exemplary embodiment the leading end portion 120A of the stopper rib 120 is curved in a shape protruding toward the opposite side from the click button 74 as viewed along the transverse direction of the click button 74. Accordingly, the spacing 13 between the leading end portion 120A of the stopper rib 120 and the bearing portion 44T3 of the click base 42 is wider at the length direction end portions 74E of the click button 74 than at the length direction central portion 74M of the click button 74.

Accordingly, when the operator presses down one of the length direction end portions 74E of the click button 74, the length direction end portion 120E of the stopper rib 120 is suppressed from contacting the bearing portion 44T3 of the click base 42 before the switch 58 is pressed down by the press portion 78. This thereby enables poor operation of the switch 58 when the length direction end portions 74E of the click button 74 are pressed down by the operator to be suppressed.

Each of the click buttons 74 is supported by the button base 72 in a cantilevered state through the pair of support arms 79A, 79B. Accordingly, when the operator presses down the click button 74, the movement amount (depression amount) is greater at the one end side (the stopper rib 120 side) than at the other end side (the reinforcement rib 130 side) in the transverse direction of the click button 74. In such cases, when one of the length direction end portions 74E of the click button 74 is pressed down by the operator, twisting could occur about a central axis running along the length direction of the click button 74.

As a countermeasure to this issue, in the present exemplary embodiment the reinforcement rib 130 is configured with lower rigidity than the stopper rib 120. Accordingly, the bending rigidity at the other end side in the transverse direction of the click button 74 is lower than the bending rigidity at the one end side in the transverse direction of the click button 74. When the operator presses down one of the length direction end portions 74E of the click button 74, the flex amount is thereby greater on the other end side (the reinforcement rib 130 side) than on the one end side (the stopper rib 120 side) in the transverse direction of the click button 74. Accordingly, as illustrated by double-dotted intermittent lines in FIG. 11, when the operator presses down one of the length direction end portions 74E of the click button 74, the difference between the movement amount (depression amount) at the one end side and the other end side in the transverse direction of the click button 74 becomes smaller. The twisting amount about the central axis running along the length direction of the click button 74 becomes smaller as a result.

Figure 14:
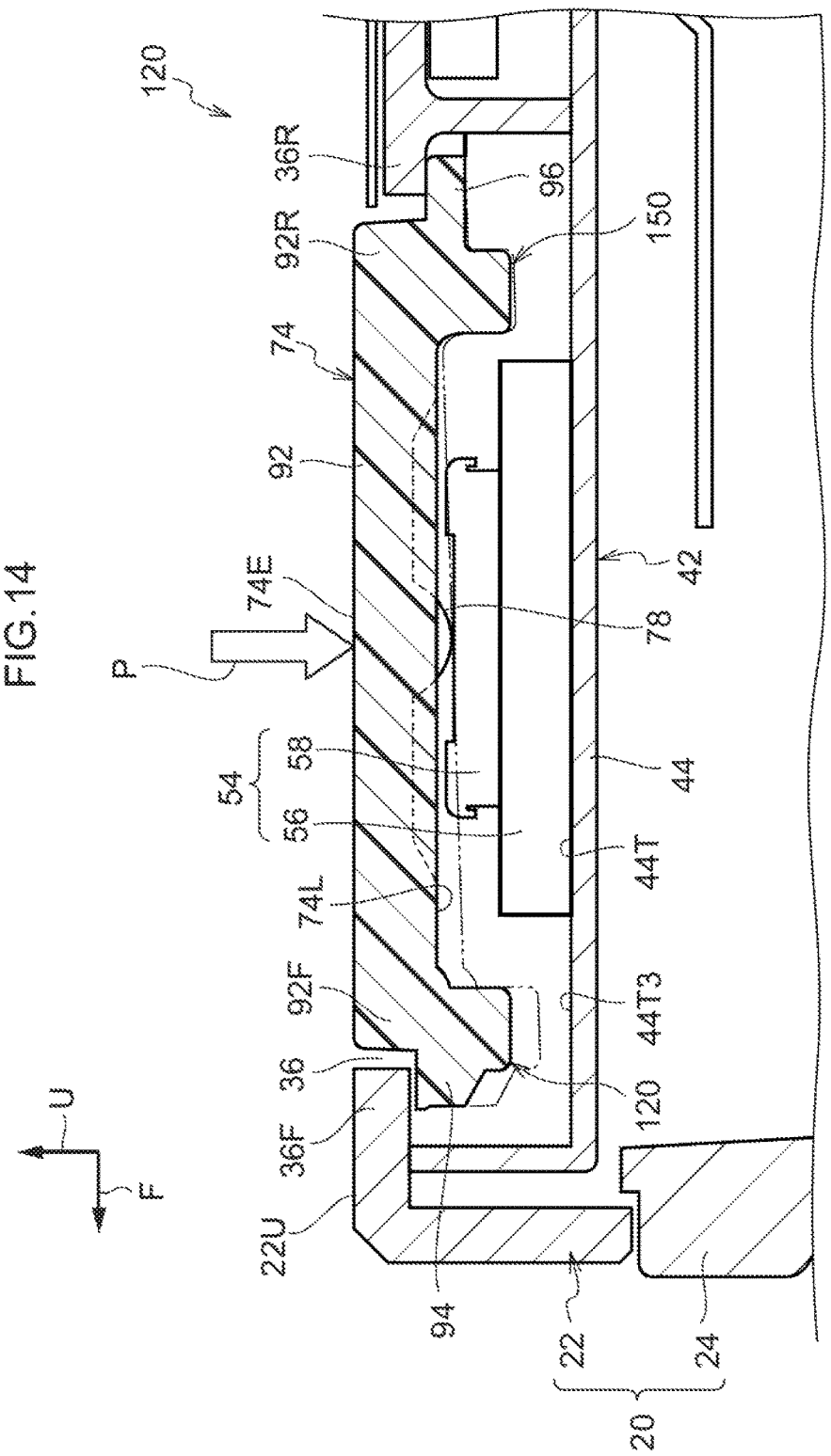
FIG. 14 is a cross-section corresponding to FIG. 12, illustrating a click button according to a comparative example.

More specific explanation follows, drawing comparisons with a comparative example. For example, in a comparative example illustrated in FIG. 14, the stopper rib 120 and the reinforcement rib 150 have the same rigidity (bending rigidity) as each other. In such cases, when the operator presses down one of the length direction end portions 74E of the click button 74, the flex amount is the same at the one end side (the stopper rib 120 side) and the other end side (the reinforcement rib 130 side) in the transverse direction of the click buttons 74. Accordingly, as illustrated by the double-dotted intermittent lines, when the operator presses down one of the length direction end portions 74E of the click button 74, the difference between the movement amount (depression amount) on the one end side and the other end side in the transverse direction of the click button 74 increases. The twisting amount about the central axis running along the length direction of the click buttons 74 increases as a result.

By contrast, in the present exemplary embodiment, as described above, the reinforcement rib 130 is configured with lower rigidity than the stopper rib 120. Accordingly, with the operator presses down one of the length direction end portions 74E of the click button 74, the difference between the movement amount (depression amount) on the one end side and the other end side in the transverse direction of the click button 74 becomes smaller. As a result, in the present exemplary embodiment, the twisting amount about the central axis running along the length direction of the click button 74 is smaller than that in the comparative example illustrated in FIG. 14.

Accordingly, when the operator presses down one of the length direction end portions 74E of the click button 74, the switch 58 is easily pressed down by the press portion 78. Poor operation of the switch 58 when the length direction end portions 74E of the click button 74 are pressed down by the operator is thereby further suppressed.

Sometimes, a stopper rib is provided at a back face of an operation button so as to contact a bearing portion inside the case and limit the press-down amount (push-in amount) of the operation button when, for example, the operation button is pressed down by the operator. Such stopper ribs are provided at the back face of the operation button so as to run along the length direction of the operation button.

However, the press-down amount of the operation button until the switch is pressed down by the press portion varies according to the position that the operator presses down in the length direction of the operation button. Specifically, for example, the operation button flexes when the operator presses down a length direction end portion of the operation button. The press-down amount of the operation button until the switch is pressed down by the press portion increases corresponding to the flex amount of the operation button. Accordingly, at the length direction end portion of the operation button, there is a possibility that the stopper rib could contact the bearing portion inside the case before the switch is pressed down by the press portion, causing the switch to operate poorly.

In response thereto, an aspect of technology disclosed herein enables poor operation of the switch to be suppressed when an end portion of the operation button are pressed down by the operator.

Next, explanation follows regarding modified examples of the exemplary embodiment described above.

Figure 15A:
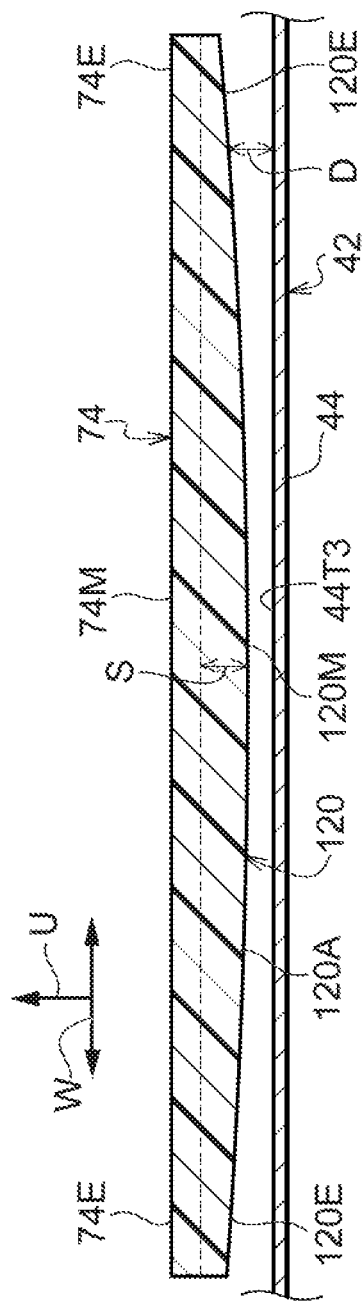
FIG. 15A is a front view of a stopper rib illustrated in FIG. 10, as viewed along a transverse direction of a click button.

In the exemplary embodiment described above, as illustrated in the schematic drawing of FIG. 15A, the leading end portion 120A of the stopper rib 120 curves in a shape protruding toward the opposite side from the click button 74 as viewed along the transverse direction of the click button 74. However, the exemplary embodiment described above is not limited thereto. For example, as illustrated in FIG. 15B, a projection direction leading end portion 122A of a stopper rib 122 may be formed in a triangular shape protruding toward the opposite side from the click button 74. In such cases, the projection length S of the stopper rib 122 gradually shortens on progression from a length direction central portion 122M toward end portions 122E on both sides in the length direction, similarly to in the exemplary embodiment described above.

Moreover, for example, as illustrated in FIG. 15C, a projection direction leading end portion 124A of a stopper rib 124 may be formed in a stepped shape as viewed along the transverse direction of the click button 74. In such cases, the projection length S of the stopper rib 124 becomes shorter in a stepped fashion on progression from a length direction central portion 124M toward end portions 124E on both sides in the length direction. The shape of the stopper rib may be modified as appropriate in this manner.

In the exemplary embodiment described above, in order to configure the reinforcement rib 130 with lower rigidity than the stopper rib 120, the projection length T of the reinforcement rib 130 is configured shorter than the projection length S of the stopper rib 120 along the entire length direction length of the reinforcement rib 130. Moreover, the thickness G2 of the reinforcement rib 130 is configured thinner than the thickness G1 of the stopper rib 120 along the entire length direction length of the reinforcement rib 130. However, configuration may be made in which the projection length T of the reinforcement rib 130 and the projection length S of the stopper rib 120 are the same as each other, and the thickness G2 of the reinforcement rib 130 is thinner than the thickness G1 of the stopper rib 120. Moreover, configuration may be made in which the thickness G2 of the reinforcement rib 130 and the thickness G1 of the stopper rib 120 are same as each other, and the projection length T of the reinforcement rib 130 is shorter than the projection length S of the stopper rib 120.

In the exemplary embodiment described above, the reinforcement rib 130 is configured with lower rigidity than the stopper rib 120; however, the rigidity of the reinforcement rib 130 may be the same as rigidity of the stopper rib 120 or greater. Moreover, the reinforcement rib 130 may be omitted.

In the exemplary embodiment described above, the click button 74 is formed with the switch recess 76, the hooking portion recess 98, and the screw recess 99. However, the switch recess 76, the hooking portion recess 98, and the screw recess 99 may be omitted.

In the exemplary embodiment described above, the switch substrate 56 is fixed to the click base 42. However, the switches 58 may be fixed to the click base 42. Moreover, the switches 58 are not limited to tactile switches, and may be configured by other switches. Moreover, the operation buttons are not limited to the click buttons 74, and may be configured by other operation buttons.

In the exemplary embodiment described above, the click base 42 is made of metal. However, the click base 42 may, for example, be made of a resin. Moreover, in the exemplary embodiment described above, the click base 42 is provided with the bearing portion 44T3. However, a bearing portion may be provided at another member.

In the exemplary embodiment described above, the button unit 40 is applied to the information processing device 10 configured by a notebook type personal computer. However, the button unit 40 may be applied to another information processing device.

Explanation has been given regarding one exemplary embodiment of technology disclosed herein. However, the technology disclosed herein is not limited to the exemplary embodiment described above. The exemplary embodiment described above may be employed in appropriate combinations with the respective modified examples, and obviously, various configurations may be implemented within a range not departing from the spirit of the technology disclosed herein.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device, comprising:
 a case;
 switch that is provided inside the case;
 an operation button that is provided at the case and that moves toward and away from the switch;
 a press portion that projects out from a length direction central portion of a button back face on a switch side of the operation button, and that faces the switch;
 a bearing portion that is provided along a length direction of the operation button inside the case, and that faces the button back face; and
 a stopper rib that projects out from the button back face, that is disposed along the length direction of the operation button at one side in a transverse direction of the operation button relative to the press portion, that faces the bearing portion, and that has a projection length from the button back face at a length direction end portion side of the operation button that is shorter than a projection length from the button back face at a length direction central portion of the operation button.

2. The information processing device of claim 1, wherein:
 a switch recess, into which a portion of the switch is inserted in conjunction with movement of the operation button toward and away from the switch, is formed at the length direction central portion of the button back face;
 the press portion projects out from a bottom wall of the switch recess; and
 the stopper rib is disposed at one side of the switch recess in the transverse direction of the operation button.

3. The information processing device of claim 1, wherein a projection length of the stopper rib from the button back face becomes shorter on progression from the length direction central portion of the operation button toward a length direction end portion of the operation button.

4. The information processing device of claim 3, wherein a projection direction leading end portion of the stopper rib curves in a shape protruding toward an opposite side from the operation button as viewed along the transverse direction of the operation button.

5. The information processing device of claim 1, wherein the stopper rib is provided spanning from one length direction end portion side of the operation button to another length direction end portion side of the operation button.

6. The information processing device of claim 1, wherein the stopper rib faces the bearing portion along an entire length of the stopper rib in a length direction of the stopper rib.

7. The information processing device of claim 1, further comprising an elastic support portion that is provided at the case, that is connected to another side in the transverse direction of the operation button, and that moves the operation button toward and away from the switch in conjunction with elastic deformation of the elastic support portion, wherein:
the stopper rib is disposed at an opposite side of the press portion from the elastic support portion.

8. The information processing device of claim 7, further comprising:
a base member that is provided along the length direction of the operation button inside the case, and that faces the button back face; and
a switch substrate that is disposed along an opposing face of the base member at an operation button side of the base member, that extends along the length direction of the operation button, and at which the switch is mounted,
wherein the stopper rib projects out from the button back face at an opposite side of the switch substrate from the elastic support portion, and faces a portion of the opposing face, the opposing face configuring the bearing portion.

9. The information processing device of claim 8, wherein the base member is made of metal.

10. The information processing device of claim 1, further comprising a reinforcement rib that projects out from the button back face, that is provided along the length direction of the operation button at another side in the transverse direction of the operation button relative to the press portion, and that has a projection length from the button back face at the length direction end portion side of the operation button that is shorter than a projection length from the button back face at the length direction central portion of the operation button.

11. The information processing device of claim 10, wherein a projection length of the reinforcement rib from the button back face becomes shorter on progression from the length direction central portion of the operation button toward a length direction end portion of the operation button.

12. The information processing device of claim 11, wherein a projection direction leading end portion of the reinforcement rib curves in a shape protruding toward an opposite side from the operation button as viewed along transverse direction of the operation button.

13. The information processing device of claim 10, wherein the reinforcement rib is provided spanning from one length direction end portion side of the operation button to another length direction end portion side of the operation button.

14. The information processing device of claim 10, wherein the reinforcement rib is configured with lower rigidity than the stopper rib.

15. The information processing device of claim 14, wherein a projection length of the reinforcement rib from the button back face is shorter than a projection length of the stopper rib from the button back face at the length direction central portion of the operation button and at the length direction end portion side of the operation button.

16. The information processing device of claim 14, wherein a thickness of the reinforcement rib is thinner than a thickness of the stopper rib.

17. The information processing device of claim 1, wherein the operation button includes:
a button main body portion that is disposed inside a button opening formed in the case; and
one end side flange portion that juts out from one transverse direction end portion of the button main body portion, and that is disposed inside the case with respect to an edge portion of the button opening,
wherein the stopper rib projects out from the one end side flange portion toward an opposite side from the operation button.

18. The information processing device of claim 1, wherein the operation button is made of resin and is formed in a flat plate shape.

19. The information processing device of claim 1, wherein the press portion presses down the switch in conjunction with movement of the operation button toward and away from the switch.

20. The information processing device of claim 1, wherein the stopper rib contacts the bearing portion in conjunction with movement of the operation button toward and away from the switch.

* * * * *